(12) United States Patent
Alberth, Jr. et al.

(10) Patent No.: US 8,577,594 B2
(45) Date of Patent: Nov. 5, 2013

(54) APPARATUS AND METHOD FOR ROUTE NAVIGATION OF MULTIPLE DESTINATIONS

(75) Inventors: William P. Alberth, Jr., Prairie Grove, IL (US); David J. Krause, Kenosha, WI (US)

(73) Assignee: Motorola Mobility LLC, Libertyville, IL (US)

( * ) Notice: Subject to any disclaimer, the term of this patent is extended or adjusted under 35 U.S.C. 154(b) by 203 days.

(21) Appl. No.: 11/586,369

(22) Filed: Oct. 25, 2006

(65) Prior Publication Data

US 2008/0103686 A1 May 1, 2008

(51) Int. Cl.
*G01C 21/00* (2006.01)

(52) U.S. Cl.
USPC .......................................... 701/400; 340/994

(58) Field of Classification Search
CPC ....................................................... G01C 21/00
USPC ................. 701/201, 25, 204, 408, 400, 527; 340/994
See application file for complete search history.

(56) References Cited

U.S. PATENT DOCUMENTS

| | | | | |
|---|---|---|---|---|
| 5,652,707 A * | 7/1997 | Wortham | ..................... | 455/456.3 |
| 5,724,243 A * | 3/1998 | Westerlage et al. | ......... | 455/456.5 |
| 5,987,377 A * | 11/1999 | Westerlage et al. | ............ | 701/204 |
| 6,691,029 B2 * | 2/2004 | Hughes et al. | ................ | 701/204 |
| 7,119,716 B2 * | 10/2006 | Horstemeyer | ................ | 340/994 |
| 7,321,824 B1 * | 1/2008 | Nesbitt | ......................... | 701/426 |
| 7,474,960 B1 * | 1/2009 | Nesbitt | ......................... | 701/533 |
| 7,627,422 B2 * | 12/2009 | Adamczyk et al. | ........... | 701/516 |
| 7,920,960 B2 * | 4/2011 | Liu et al. | ....................... | 701/118 |
| 7,940,742 B2 * | 5/2011 | Lee et al. | ....................... | 370/349 |
| 7,966,122 B2 * | 6/2011 | Flynn et al. | .................... | 701/528 |
| 8,041,312 B2 * | 10/2011 | Endo | ............................. | 455/90.2 |
| 2002/0053985 A1 * | 5/2002 | Nesbitt | ......................... | 340/994 |
| 2002/0099500 A1 * | 7/2002 | Schmier et al. | ............... | 701/200 |
| 2004/0102896 A1 * | 5/2004 | Thayer et al. | ................. | 701/207 |
| 2004/0107048 A1 * | 6/2004 | Yokota | .......................... | 701/211 |
| 2004/0254985 A1 * | 12/2004 | Horstemeyer | ................ | 709/205 |
| 2005/0075116 A1 | 4/2005 | Laird et al. | | |
| 2005/0187703 A1 * | 8/2005 | Seligmann | ..................... | 701/201 |
| 2007/0001873 A1 * | 1/2007 | Ishikawa | ....................... | 340/994 |
| 2007/0078594 A1 * | 4/2007 | Mori | .............................. | 701/207 |
| 2007/0088495 A1 * | 4/2007 | Ibrahim | ........................ | 701/206 |

OTHER PUBLICATIONS

Natalia Marmasse, Chris Schmandt; "A user-Centered Location Model", MIT Media Laboratory, Cambridge, MA, USA, 2002, 4 pages.
Daniel Ashbrook,Thad Starner; "Using GPS to learn significant locations and predict movement across multiple users", College of Computing, Georgia Institute of Technology, Atlanta, GA, USA, Feb. 2, 2003, 12 pages.

* cited by examiner

*Primary Examiner* — Tuan C. To
(74) *Attorney, Agent, or Firm* — Gary J. Cunningham

(57) ABSTRACT

An apparatus and method for route navigation for multiple destinations. Route parameters can be received and a route (140, 142) can be generated for multiple destinations (132, 134). An estimated time of arrival can be calculated for each destination. An updated estimated time of arrival can be generated for one of the destinations. A messaging service message including the updated time of arrival can be sent to a recipient (122, 124) associated with the respective destination if the updated time of arrival deviates from the original estimated time of arrival.

8 Claims, 3 Drawing Sheets

APPARATUS AND METHOD FOR ROUTE NAVIGATION OF MULTIPLE DESTINATIONS

BACKGROUND

1. Field

The present disclosure is directed to a method and apparatus for route navigation of multiple destinations. More particularly, the present disclosure is directed to generating a route between an origin and multiple destinations and establishing an estimated time of arrival at each destination.

2. Description of Related Art

Presently, navigation devices can utilize global position system information to find a best navigation path based on fixed locations. For example, a vehicle navigation device can provide a driver with electronic routing maps and navigation aids. The vehicle navigation device can be coupled to a location finding device in the vehicle, such as a Global Positioning System (GPS) receiver. The GPS receiver can determine the current location of the vehicle using GPS satellites. The location can be displayed on a map and used in determining routing instructions.

Furthermore, a navigation device can use map data located on the device or map data supplied by a remote map server. For example, a smart cellular telephone or personal digital assistant can retrieve map data from the server over a wireless link, display the respective map, and provide navigation instructions to the user.

When following a route using a navigation device, a user may desire to make multiple stops. For example, a user may need to perform multiple errands and pick up multiple friends. While following the route, the user may encounter an unexpected delay when picking up one of the friends that affects an estimated time of arrival at other destinations. Unfortunately, current navigation devices do not provide for route navigation for multiple destinations and do not provide for sending updated estimated times of arrival for recipients at each destination.

Thus, there is a need for an apparatus and method for route navigation for multiple destinations that can send a messaging service message including an updated time of arrival to a recipient at a destination when a user encounters a delay when traveling a route to the destination.

SUMMARY

An apparatus and method for route navigation for multiple destinations. Route parameters can be received and a route can be generated for multiple destinations. An estimated time of arrival can be calculated for each destination. An updated estimated time of arrival can be generated for one of the destinations. A messaging service message including the updated time of arrival can be sent to a recipient associated with the respective destination if the updated time of arrival deviates from the original estimated time of arrival.

BRIEF DESCRIPTION OF THE DRAWINGS

The embodiments of the present disclosure will be described with reference to the following figures, wherein like numerals designate like elements, and wherein.

DETAILED DESCRIPTION

Figure 1:
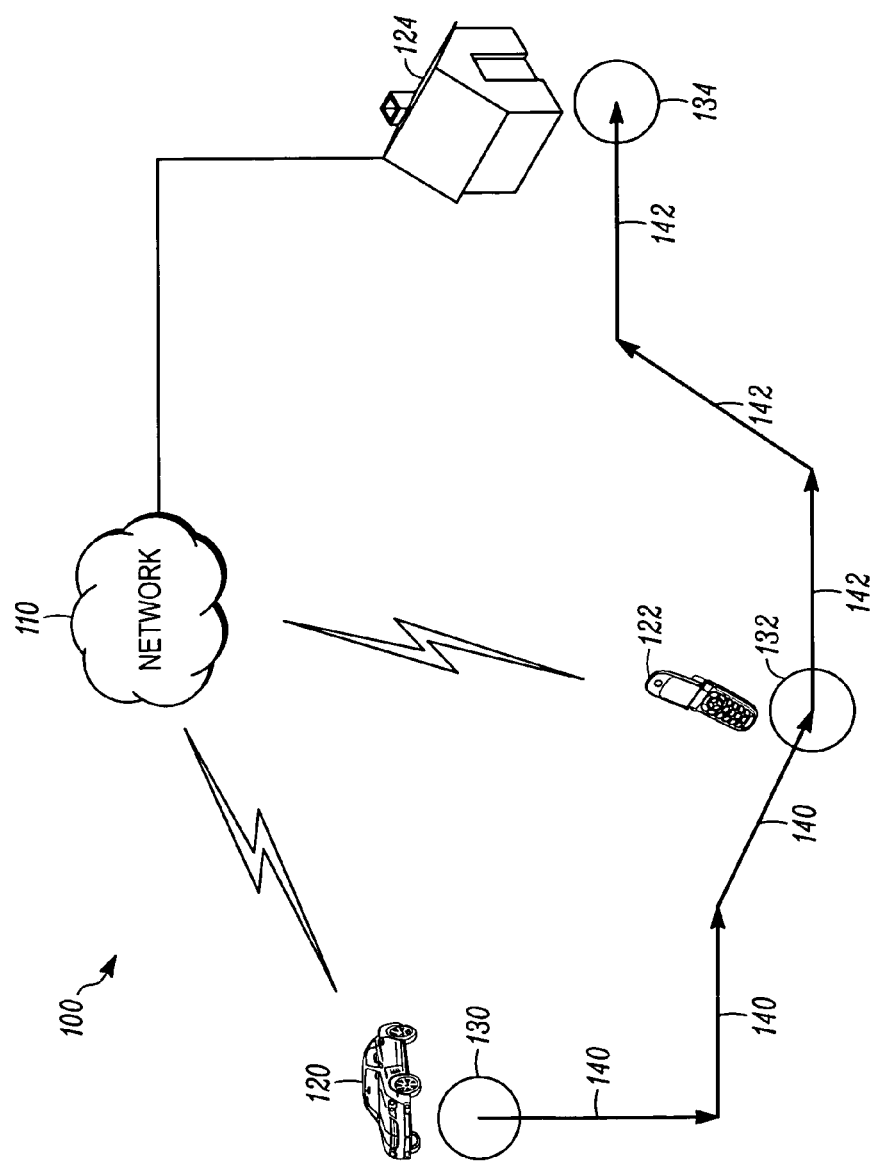
FIG. 1 is an exemplary block diagram of a system according to one embodiment.

FIG. 1 is an exemplary block diagram of a system 100 according to one embodiment. The system 100 can include a network 110, and terminals 120, 122, and 124. The terminals 120, 122, and 124 may be or may include wired or wireless communication devices, such as a wireless telephone, a cellular telephone, a personal digital assistant, a pager, a personal computer, a selective call receiver, a navigation device, or any other device that is capable of sending and receiving communication signals on a network including wireless network. For example, the terminal 120 may be a wireless device in a car, the terminal 122 may be a portable phone, and the terminal 124 may be a wired communication device in a home.

The network 110 may include any type of network that is capable of sending and receiving signals, such as wireless signals. For example, the network 110 may include a wireless telecommunications network, a cellular telephone network, a Time Division Multiple Access (TDMA) network, a Code Division Multiple Access (CDMA) network, a satellite communications network, and other like communications systems. Furthermore, the network 110 may include more than one network and may include a plurality of different types of networks. Thus, the network 110 may include a plurality of data networks, a plurality of telecommunications networks, a combination of data and telecommunications networks and other like communication systems capable of sending and receiving communication signals.

In operation, the terminal 120 can include at least one antenna and a transceiver coupled to the antenna. The terminal 120 can also include an interface module configured to receive route parameters including information corresponding to an origin 130, information corresponding to a first destination 132, and information corresponding to a second destination 134. For example, the information corresponding to the origin 130 or the destinations 132 and 134 may be received from a user interface, a global positioning system module, a map function, a web interface, a wireless interface, or any other means for receiving information regarding a location. The terminal 120 can also include a controller and a route generation module coupled to the controller. The route generation module can generate a route. The route can include a first series of road segments 140 connecting the origin 130 to the first destination 132 and a second series of road segments 142 connecting the first destination 132 to the second destination 134.

The route may also be generated based on other route parameters. For example, a route may be generated based on the location of the terminal 122 where the terminal 122 can send location information to the terminal 120. The route may be generated based on where the terminal 122 is currently located or may even be generated to include a recommended departure time based on a desired arrival time for the terminal 122 at the first destination 132.

The terminal 120 can also include a time of arrival calculation module coupled to the controller. The time of arrival calculation module can calculate a first estimated time of arrival at the first destination 132 and a second estimated time of arrival at the second destination 134. The estimated times of arrival may be displayed to a user of the terminal, sent to devices located at the destinations, stored in a log, or otherwise utilized. The first estimated time of arrival may be based on a time of traveling the first series of road segments 140, may be based on an estimated time of departure from the origin 130, may be based on a historical preparation time before departing from the origin 130, and the like. The second estimated time of arrival can be based on a time of traveling the first series of road segments 140 and the second series of road segments 142 and based on a historical duration of time spent at the first destination 132. The second estimated time of arrival may also be based on other similar factors related to the first estimated time of arrival.

The time of arrival calculation module also can also update the second estimated time of arrival to establish a new second estimated time of arrival at the second destination 124. The terminal 120 can also include a deviation determination module that can determine a deviation between the second estimated time of arrival and the new second estimated time of arrival has exceeded a threshold. The terminal 120 can also include a memory that stores an association of a recipient, such as the terminal 124, with the second destination 134. The controller in the terminal 120 can send a messaging service message to the recipient 124 associated with the second destination 134 when the deviation from the second time of arrival exceeds the threshold, where the messaging service message includes the new second estimated time of arrival.

The recipient may be a device located at the second destination. For example, the recipient device may be used by an individual waiting to be picked up, may be used by an individual waiting for someone to be dropped off, may be used by an individual waiting for a delivery, or used by any other individual, device, or system. The recipient may also be coupled to home automation devices that may begin operation based on an estimated arrival time of a homeowner. Also, the recipient may be a device owned by a user who is interested in an arrival at the second destination. For example, such a user may be a parent interested in when a child arrives at a destination, may be a sender interested in when a package arrives at a destination, may be an employer interested in when an employee arrives at a destination, or the like.

Thus, for example, the present disclosure can provide for rich assistance for planning trips, such as trips around town. Historical information, user and device presence and location, navigation information, and messaging can be combined to make daily life easier. For example, a mother may be going to the movies. She has to pick up three friends on the way, but she also needs to stop at a store to buy a present and drop off her son at a party. She can use an internet web browser to find the movie. She can then identify the friends to pick up and identify the party location from a contact list. By using the present system, she can use a user interface to indicate the stop at the store. She can also indicate the priority and requirements for the stops. For example, she can indicate the stop at the store must be performed before the stop at the party. The system can obtain presence information, such as the location of her friends, and expected delay at each stop information. For example, one friend may be at work with no expected wait and another friend may be at home with an expected wait of 10 minutes. The system can build a route based on inputted information, current traffic information, road status information, and other information. The system can also determine the route and departure time to arrive at movie theatre based on movie start time. When the system presents the suggested route, the user can modify order of destinations, move start or arrive time, and modify other parameters. The route can be recalculated until the user accepts the suggested route. Notices can be sent using wireless messaging service messages to parties, the notices including estimated time of arrival, pick up, drop off, and the like. The recipients can set an alarm or reminder, for example to provide an alarm 5 minutes before the mother arrives.

Accordingly, the mother can take her son and start the journey. She can then pick up one friend at a first destination and then stop at the store. However, the stop at the store may takes 10 minutes longer then predicted. A messaging service can send an update messaging service message to friends at the other destinations. The update messaging service message can include the updated estimated time of arrival. The mother can then drop off her son at his friend's house and pick up her second friend. However, her second friend may be ready early. For example, her second friend may normally take 15 minutes to get ready once she arrives, but today her friend may only take 5 minutes. A historical average of expected wait time may be updated in the system based on the reduced wait time. An updated estimated time of arrival can then be sent to the third friend upon leaving the second friend's house. The third friend may have home automation. Upon picking up the third friend, the third friend's device can note that the third friend is not in the house and instruct the security system to arm and cut back on the air conditioning. After the movie, on the way home the system can pick a route to drop everyone off and sends expected arrival time to each persons' phone. Also, the second friend's husband may contact the second friend's phone to determine expected arrival time. Additionally, the second friend's device can inform the home automation of an expected arrival time. The home automation can then automatically adjust the air conditioning so the house will be comfortable upon arrival and can start dinner in an automated refrigerator/oven so that it will be done when the third friend arrives. However, the mother and the third friend may decide to go out for dinner. The mother or the third friend's device can note that they are not on path to go home and/or the mother's device can send an update to the third friend's device indicating an unknown estimated time of arrival. The third friend's device may then remind the third friend of pending dinner at home or may automatically have the home automation adjust accordingly.

Therefore, the present system and devices can plan a route based on the presence and/or location of targets. The route can be based on information from a browser or calendar, such as movie search information, restaurant reservation information, meeting information, and the like. The route can also be based on traffic information, required arrival or departure time, historical time required at stops, and other useful information. The system and/or devices can send messaging service message to recipients at destinations and other interested recipients to inform the recipients of an estimated time of arrival, estimated time of arrival updates, reminders, and the like. The system can also be used for package delivery estimated times of arrival, cable installer arrival times, repairmen arrival times, and the like.

Figure 2:
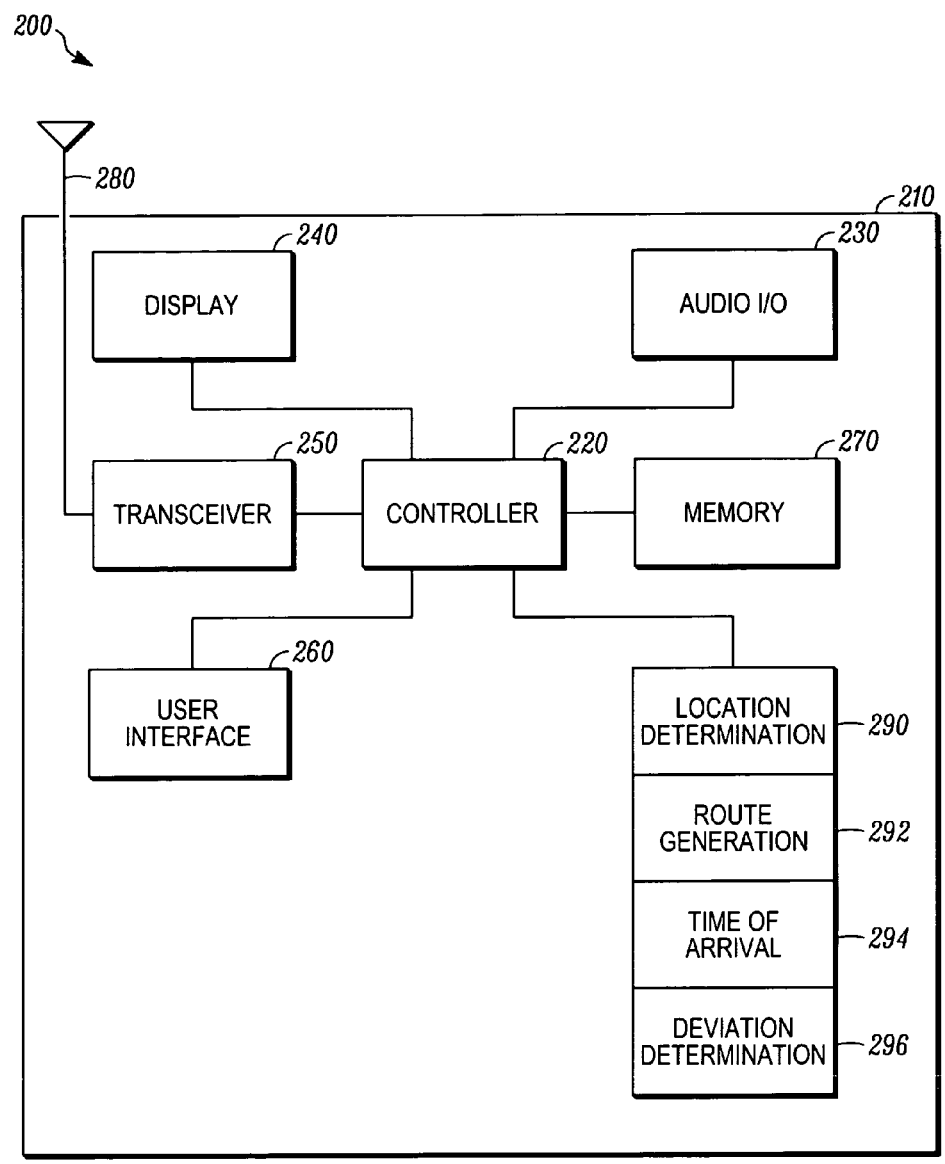
FIG. 2 is an exemplary block diagram of a wireless communication device according to one embodiment.

FIG. 2 is an exemplary block diagram of a wireless communication device 200, such as the terminal 120, according to one embodiment. The wireless communication device 200 can include a housing 210, a controller 220 coupled to the housing 210, audio input and output circuitry 230 coupled to the housing 210, a display 240 coupled to the housing 210, a transceiver 250 coupled to the housing 210, a user interface 260 coupled to the housing 210, a memory 270 coupled to the housing 210, and an antenna 280 coupled to the housing 210 and the transceiver 250. The wireless communication device 200 can also include a location determination module 290, a route generation module 292, a time of arrival calculation module 294, and a deviation determination module 296. The location determination module can be a global positioning system module. The location determination module 290, the route generation module 292, the time of arrival calculation module 294, and the deviation determination module 296 can be coupled to the controller 220, can reside within the controller 220, can reside within the memory 270, can be autonomous modules, can be software, can be hardware, or can be in any other format useful for a module on a wireless communication device 200. Parts of the location determination module 290, route generation module 292, time of arrival module 294, and deviation determination module 296 may also be located as part of the infrastructure in the network 110.

The display 240 can be a liquid crystal display (LCD), a light emitting diode (LED) display, a plasma display, or any other means for displaying information. The transceiver 250 may include a transmitter and/or a receiver. The audio input and output circuitry 230 can include a microphone, a speaker, a transducer, or any other audio input and output circuitry. The user interface 260 can include a keypad, buttons, a touch pad, a joystick, an additional display, or any other device useful for providing an interface between a user and an electronic device. The memory 270 may include a random access memory, a read only memory, an optical memory, a subscriber identity module memory, or any other memory that can be coupled to a wireless communication device. The user interface 260, the transceiver 250, the location determination module 290, or other useful modules may comprise an interface module for receiving parameters and information via user input, via wireless communications, via satellite information, or from any other useful means. Also, the location determination module 290 may include its own antenna.

In operation, the interface module can receive route parameters including information corresponding to an origin 130, information corresponding to a first destination 132, and information corresponding to a second destination 134. The route parameters may also include traffic information, for example, received from a satellite system, from wireless messages, or the like. The controller 220 can control operations of the device 200. The route generation module 292 can generate a route including a first series of road segments 140 connecting the origin 130 to the first destination 132 and a second series of road segments 142 connecting the first destination 132 to the second destination 134. The route can be generated based upon a desired arrival time and a desired departure time at the first destination 132 or the second destination 134. The route can also be generated based on avoiding road segments having traffic congestion above a traffic congestion threshold.

The time of arrival calculation module 294 can calculate a first estimated time of arrival at the first destination 132 and a second estimated time of arrival at the second destination 134. The second estimated time of arrival can be based on a time for traveling the first series of road segments 140 and a time for traveling the second series of road segments 142. The second estimated time of arrival can also be based on a historical duration of time spent at the first destination 132. For example, the historical duration of time spent at the first destination 132 can be based on an average of past measured amounts of time spent at the first destination 132. Thus, the controller 220 can measure an amount of time spent at the first destination 132 and update the historical duration of time spent at the first destination 132 with the measured amount of time spent at the first destination 132.

The time of arrival calculation module 294 can also update the second estimated time of arrival to establish a new second estimated time of arrival. For example, while the terminal 120 is traveling to the first destination 132, the terminal 120 may encounter a delay due to unexpected traffic congestion, due to a flat tire, due to an unplanned stop for gas or food, or due to any other delay. The time of arrival calculation module 294 can then recalculate a new second estimated time of arrival that reflects the delay. The deviation determination module 296 can determine a deviation in the second estimated time of arrival from the new second estimated time of arrival. The memory 270 can store an association of a recipient, such as the terminal 124, with the second destination 134 and the information corresponding to the second destination 134 can be based on the location of the recipient. The controller 220 can then send a messaging service message to the recipient 124 associated with the second destination 134, the messaging service message including the new second estimated time of arrival.

For example, the deviation determination module 296 can determine the deviation from the second estimated time of arrival has exceeded a threshold and the controller 220 can send the messaging service message if the deviation from the second estimated time of arrival has exceeded the threshold. The messaging service message can be a short messaging service message, a multimedia messaging service message, an enhanced messaging service message, or any other message sent from a selective call receiver, such as a wireless phone.

The controller 220 can also set a reminder associated with an amount of time to reach the second destination 134 and send a reminder messaging service message to the recipient 124 associated with the second destination when a time to reach the second destination is substantially equal to the amount of time to reach the second destination associated with the reminder.

Figure 3:
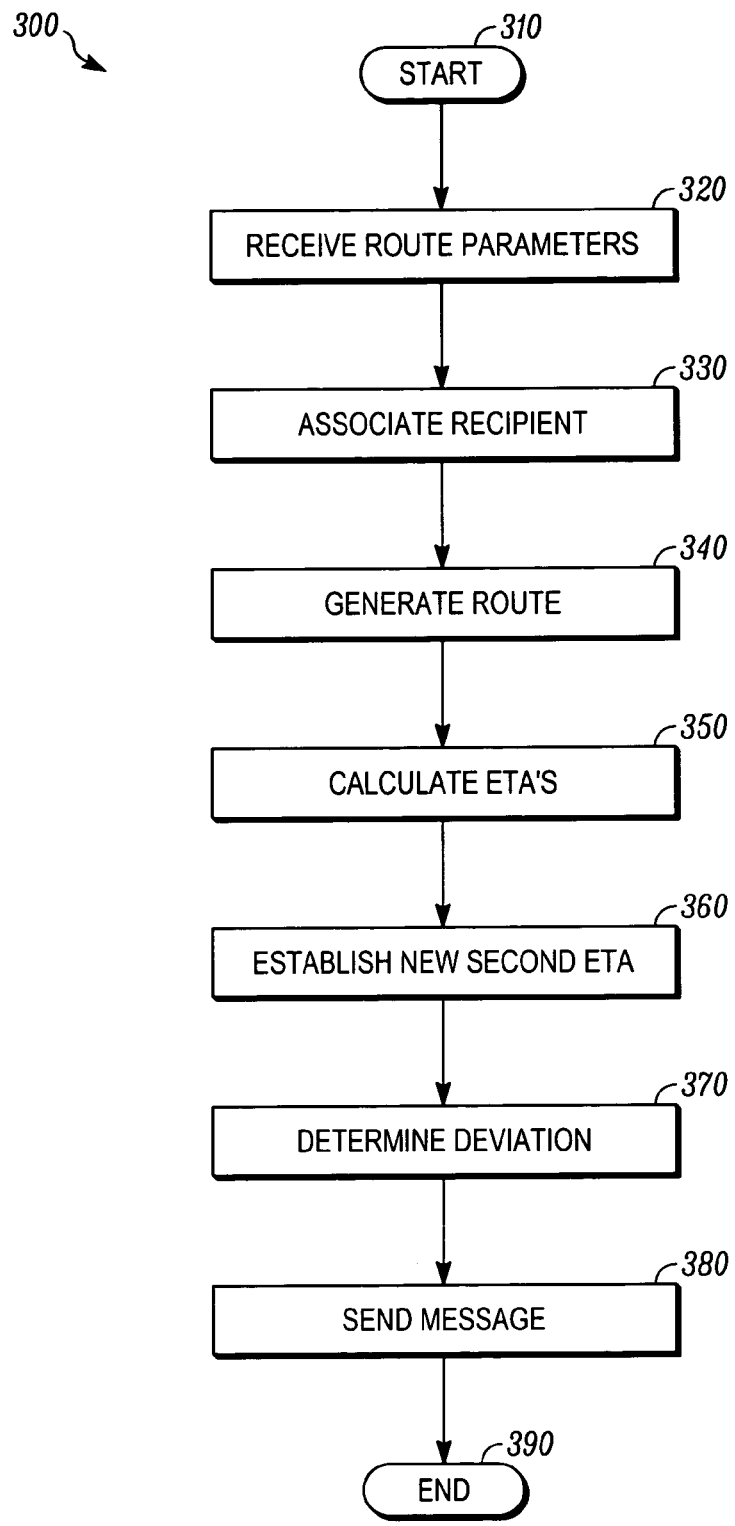
FIG. 3 is an exemplary flowchart illustrating the operation of a wireless communication device according to one embodiment.

FIG. 3 is an exemplary flowchart 300 illustrating the operation of the wireless communication device 200 according to another embodiment. In step 310, the flowchart begins. In step 320, the wireless communication device 200 can receive route parameters including information corresponding to an origin, information corresponding to a first destination, and information corresponding to a second destination. The information corresponding to the second destination can be based on the location of a recipient. The route parameters can also include traffic information. In step 330, the wireless communication device 200 can associate a recipient with the second destination.

In step 340, the wireless communication device 200 can generate a route. The route can include a first series of road segments connecting the origin to the first destination and a second series of road segments connecting the first destination to the second destination. The route can be generated based upon a desired arrival time or a desired departure time at the first destination or the second destination. The route can also be generated based on avoiding road segments having traffic congestion above a traffic congestion threshold.

In step 350, the wireless communication device 200 can calculate a first estimated time of arrival at the first destination and a second estimated time of arrival at the second destination. The second estimated time of arrival can be based on a time of traveling the first series of road segments and the second series of road segments. The second estimated time of arrival can also be based on a historical duration of time spent at the first destination. The historical duration of time spent at the first destination can be based on an average of past measured amounts of time spent at the first destination.

In step 360, the wireless communication device 200 can establish a new second estimated time of arrival after calculating the second estimated time of arrival. In step 370, the wireless communication device 200 can determine a deviation between the second estimated time of arrival and the new second estimated time of arrival. For example, the wireless communication device 200 can determine the deviation from the second estimated time of arrival has exceeded a threshold.

In step 380, the wireless communication device 200 can send a messaging service message to the recipient associated with the second destination based on the deviation from the second estimated time of arrival, where the messaging service message can include the new second estimated time of arrival. The messaging service message can be sent if the deviation from the second estimated time of arrival has exceeded the threshold. The messaging service message can be a short messaging service message, a multimedia messaging service message, an enhanced messaging service message, or the like. In step 380, the wireless communication device 200 may also send a reminder messaging service message to the recipient associated with the second destination based on a reminder setting, such as an alarm, set to send the reminder when the wireless communication device 200 is a specified amount of time from the second destination. In step 390, the flowchart 300 ends.

The method of this disclosure is preferably implemented on a programmed processor. However, the controllers, flowcharts, and modules may also be implemented on a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which resides a finite state machine capable of implementing the flowcharts shown in the Figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the preferred embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed is:

1. A method comprising:
   determining route parameters including information corresponding to an origin, information corresponding to a first destination, and information corresponding to a second destination;
   associating a recipient terminal with the second destination;
   generating a route, the route comprising a first series of segments connecting the origin to the first destination and a second series of segments connecting the first destination to the second destination;
   calculating via a calculation module a first estimated time of arrival at the first destination and a second estimated time of arrival at the second destination, the second estimated time of arrival based on a time of traveling the first series of segments and the second series of segments, the second estimated time of arrival also based on an estimated historical average duration of time spent at, at least one of the first destination and the second destination, the estimated historical average duration of time spent at, at least one of the first destination and second destination, is based on an average of past measured amounts of time spent at, at least one of the first destination and the second destination;
   sending via a controller a message to the recipient terminal associated with the second destination based on the deviation from the second estimated time of arrival, the message including the new second estimated time of arrival;
   determining an updated second time of arrival; and
   sending via a controller, if a deviation from the second estimated time of arrival has exceeded a threshold, an updated message to the recipient associated with the second destination, the message including the new second estimated time of arrival.

2. The method of claim 1 wherein the duration of time spent at the first destination is estimated from a period of time entered by the user.

3. The method according to claim 1, wherein the route is generated based upon one selected from the group of a desired arrival time and a desired departure time at one selected from the group of the first destination and the second destination.

4. The method according to claim 1,
   wherein the route parameters include traffic information, and
   wherein the route is generated based on avoiding segments having traffic congestion above a traffic congestion threshold.

5. The method according to claim 1, wherein the information corresponding to the second destination is based on the location of the recipient terminal.

6. The method according to claim 1, further comprising:
   measuring an amount of time spent at the first destination; and
   updating the historical duration of time spent at the first destination with the measured amount of time spent at the first destination.

7. The method according to claim 1, wherein the historical duration of time spent at the first destination is based on an average of past measured amounts of time spent at the first destination.

8. The method according to claim 1, further comprising:
   setting a reminder associated with an amount of time to reach the second destination;
   sending a reminder message to the recipient terminal associated with the second destination when a time to reach the second destination is substantially equal to the estimated amount of time to reach the second destination associated with the reminder.

* * * * *